(12) United States Patent
Georganti (10) Patent No.: US 11,068,233 B2
(45) Date of Patent: Jul. 20, 2021

(54) SELECTING A MICROPHONE BASED ON ESTIMATED PROXIMITY TO SOUND SOURCE

(71) Applicant: Sonova AG

(72) Inventor: Eleftheria Georganti, Zurich (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/754,778

(22) PCT Filed: Oct. 13, 2017

(86) PCT No.: PCT/EP2017/076221
§ 371 (c)(1),
(2) Date: Apr. 9, 2020

(87) PCT Pub. No.: WO2019/072401
PCT Pub. Date: Apr. 18, 2019

(65) Prior Publication Data
US 2020/0301651 A1     Sep. 24, 2020

(51) Int. Cl.
*G06F 3/16*     (2006.01)
*H04R 3/00*    (2006.01)
*H04R 25/00*   (2006.01)

(52) U.S. Cl.
CPC .............. *G06F 3/165* (2013.01); *H04R 3/00* (2013.01); *H04R 25/554* (2013.01); *H04R 2420/01* (2013.01); *H04R 2420/07* (2013.01)

(58) Field of Classification Search
CPC .... H04R 3/00; H04R 25/554; H04R 2420/01; H04R 2420/07
See application file for complete search history.

(56) References Cited

U.S. PATENT DOCUMENTS

2014/0180686 A1   6/2014   Schuck
2019/0139563 A1*  5/2019   Chen .................... G06N 3/0445

FOREIGN PATENT DOCUMENTS

WO          0152597 A1      7/2001

OTHER PUBLICATIONS

European Patent Office, International Searching Authority, International Search Report for PCT/EP2017/076221, dated Apr. 1, 2019, Rijswijk, Netherlands.

(Continued)

*Primary Examiner* — Regina N Holder
(74) *Attorney, Agent, or Firm* — ALG Intellectual Property, LLC (57) ABSTRACT

In some implementations, the disclosed technology determines that a microphone is likely closer to a sound source compared to other microphones partially based on determining a spectral standard deviation associated with an audio signal captured by the microphone. In some implementations, the disclosed technology determines a spectral standard deviation of audio signals associated with different microphones and determines that the microphone with the lowest spectral standard deviation is likely the closest microphone to a sound source. The disclosed technology can determine the closest microphone generally independent of input signal level, independent of microphone sensitivity, independent of microphone design, independent of microphone manufacturer, and independent of the sound source intensity (e.g., "loud" or "soft").

15 Claims, 3 Drawing Sheets

(56) References Cited

OTHER PUBLICATIONS

Knapp, C., & Carter, G. (1976). The generalized correlation method for estimation of time delay. IEEE Transactions on Acoustics, Speech, and Signal Processing, 24(4), 320-327. doi:10.1109/tassp.1976.1162830.

Yan-Chen Lu, & Cooke, M. (2010). Binaural Estimation of Sound Source Distance via the Direct-to-Reverberant Energy Ratio for Static and Moving Sources. IEEE Transactions on Audio, Speech, and Language Processing, 18(7), 1793-1805. doi:10.1109/tasl.2010.2050837.

Hioka, Y., Niwa, K., Sakauchi, S., Furuya, K., & Haneda, Y. (2011). Estimating Direct-to-Reverberant Energy Ratio Using D/R Spatial Correlation Matrix Model. IEEE Transactions on Audio, Speech, and Language Processing, 19(8), 2374-2384. doi:10.1109/tasl.2011.2134091.

Kuster, M. (2011). Estimating the direct-to-reverberant energy ratio from the coherence between coincident pressure and particle velocity. The Journal of the Acoustical Society of America, 130(6), 3781-3787. doi:10.1121/1.3658446.

Georganti, Eleftheria & May, Tobias & Par, Steven & Mourjopoulos, John. (2013). Sound Source Distance Estimation in Rooms based on Statistical Properties of Binaural Signals. IEEE Audio, Speech, Language Process.. 21. 1727-1741. 10.1109/TASL.2013.2260155.

\* cited by examiner

SELECTING A MICROPHONE BASED ON ESTIMATED PROXIMITY TO SOUND SOURCE

TECHNICAL FIELD

The disclosed technology determines a microphone that is likely closest to a sound source relative to other microphones and selects that microphone for capturing sound from the sound source. For example, the disclosed technology selects a microphone in a classroom that is closest to a teacher speaking relative to other microphones in the classroom. The disclosed technology can also use the selected microphone to provide audio to a hearing aid.

BACKGROUND

The proliferation of technology into every corner of human life, starting with cellular technology and continuing into the Internet of Things, has resulted in an abundance of microphones available for use in any space. For example, a classroom with a teacher and students can include more than 10 microphones in: laptops, smartphones, a handheld or body worn device, hearings aids, and a television (TV). Each of these microphones can have a different sensitivity, produce different signal-to-noise ratios (SNRs), or be located at a different position relative to a sound source—a sound source generates an acoustical output, e.g., a sound source is an electronic speaker or human voice.

Because of this variety in microphone properties, each microphone likely receives and transmits a different audio signal associated with listening to a sound source. For example, the microphone closest to a teacher's mouth in a classroom may provide a different audio signal for listening to the teacher than a microphone coupled to a smartphone sitting on a desk near the teacher. The proximity of a sound source to a microphone can be useful in providing sound to a user.

In hearing aids, determining a distance between a microphone and a sound source is important because the hearing impaired general need a high-quality audio. For example, a hearing aid with knowledge of the distance between a listener wearing the hearing aid and a sound source can assist the hearing aid in determining optimal listening parameters related to beamformer strength, enabling/disabling acoustic scene analysis, and enabling or disabling streaming.

However, current methods for determining the distance between a microphone and sound source have shortcomings. For example, one current method for detecting the nearest microphone to a sound source is to compare SNRs for different microphones or compare the absolute sound levels of the signals arriving at two different microphones. Yet, for this method, the microphones should have similar characteristics (e.g. sensitivity) or the systems should have been calibrated in advance to determine amplitude or root-mean squared values of audio signals corresponding to a specific sound level in decibels (dB). Other methods of distance detecting such as time delay or positioning technology are processing intensive and/or costly.

Accordingly, a need exits to address the shortcomings of the methods described above and provide additional benefits.

BRIEF DESCRIPTION OF THE DRAWINGS

The disclosure and accompanying figures describe some implementations of the disclosed technology.

The figures are not drawn to scale and have various viewpoints and perspectives. Some components or operations shown in the figures may be separated into different blocks or combined into a single block for the purposes of discussion. Although the disclosed technology is amenable to various modifications and alternative forms, specific implementations have been shown by way of example in the figures and are described in detail below. The intention, however, is not to limit the disclosed technology to the particular implementations. Rather, the disclosed technology is intended to cover all modifications, equivalents, and alternatives falling within the scope of the disclosed technology as defined by the appended claims.

DETAILED DESCRIPTION

The disclosed technology determines a microphone that is likely closest to a sound source relative to other microphones and selects that microphone for capturing sound from the sound source. For example, the disclosed technology selects a microphone in a classroom that is closest to a teacher speaking relative to other microphones in the classroom. The disclosed technology can also use the selected microphone to provide audio to a hearing aid.

In some implementations, the disclosed technology determines that a microphone is likely closer to a sound source compared to other microphones partially based on determining a spectral standard deviation associated with an audio signal captured by the microphone. As discussed further in this disclosure, microphones receiving audio signals at distances closer to a sound source present lower values of spectral standard deviation compared to microphones receiving audio signals taken at larger distances between the microphone and the sound source. Spectral standard deviation values are generally highly distance-dependent, independent of input level, independent of sensitivity, independent of time delay when processing audio signals (obtained from the multiple microphones), independent of microphone model, and independent microphone manufacturer.

Accordingly, in some implementations, the disclosed technology calculates the spectral standard deviation associated with multiple audio signals captured by multiple microphones and uses this computed spectral standard deviation value(s) to determine which microphone is estimated to be closer to the sound source. Note, distance refers to an estimated distance and not necessarily an exact measured distance. For example, the spectral standard deviation can correspond to general proximity of a microphone to a sound source relative to other microphones receiving sound from the sound source, where each microphone can be at a different position relative to the sound source.

In some implementations, the disclosed technology calculates the spectral standard deviation either in frequency bands or full-band for the detection of the microphone sensor that is closer to a sound source. For example, an instance of an audio signal is captured as a time domain waveform (s(n)), where n correspond to the time samples and consists of α number of samples, the audio signal is transformed to the frequency domain using the Fourier Transform and its spectrum is obtained (S(ω)), where w is the frequency, then a magnitude of the spectrum is calculated in dB. ($S_{dB}(\omega)$)) $S_{dB}(\omega)=20*\log_{10}(|S(\omega)|)$ and the standard deviation of the spectrum magnitude ($\sigma^2_s$) is calculated either for the full band signal and/or for a specific frequency band i ($\sigma^2_s$), which can include finding the mean of the magnitude spectrum (μ) for all frequency bins, calculating the square of its distance to the mean, as $|s(n)-\mu|^2$ summing the values $\Sigma|s(n)-\mu|^2$ and dividing by the number of data points, as ($\Sigma|s(n)-\mu|^2$) and determining the square root of the values obtained. In determining the spectral standard deviation values with a frame sizes of 0.5 second, 1 second, 2 seconds, or 4 seconds can be used, where it may be preferred to use longer time frames to have a robust value.

In some implementations, the disclosed technology has at least one benefit. For example, the disclosed technology determines the closest microphone independent of input signal level, independent of microphone sensitivity, independent of microphone design, independent of microphone manufacturer, and independent of the sound source intensity (e.g., "loud" or "soft"). Another benefit is that the system can be used as a calibration stage or to train machine learning algorithms. Additionally, the disclosed technology does not need to use large amounts of processing power to determine the microphone closest to a sound source because the algorithm to determine spectral standard deviation and compare spectral standard deviations is not intensive. In some implementations, the disclosed technology has a benefit of not transmitting an audio signal to a receiver until it is determined that the audio signal is associated with a microphone with the lowest spectral standard deviation of multiple audio signals. For example, all microphones near a sound source can receive a sound and transmit spectral standard deviations associated with that sound. The disclosed technology can first determine the lowest spectral standard deviation, and then select the microphone associated with the lowest spectral standard deviation for receiving the audio signal. This can reduce the amount of bandwidth used and energy used to transmit the audio signal.

Figure 1:
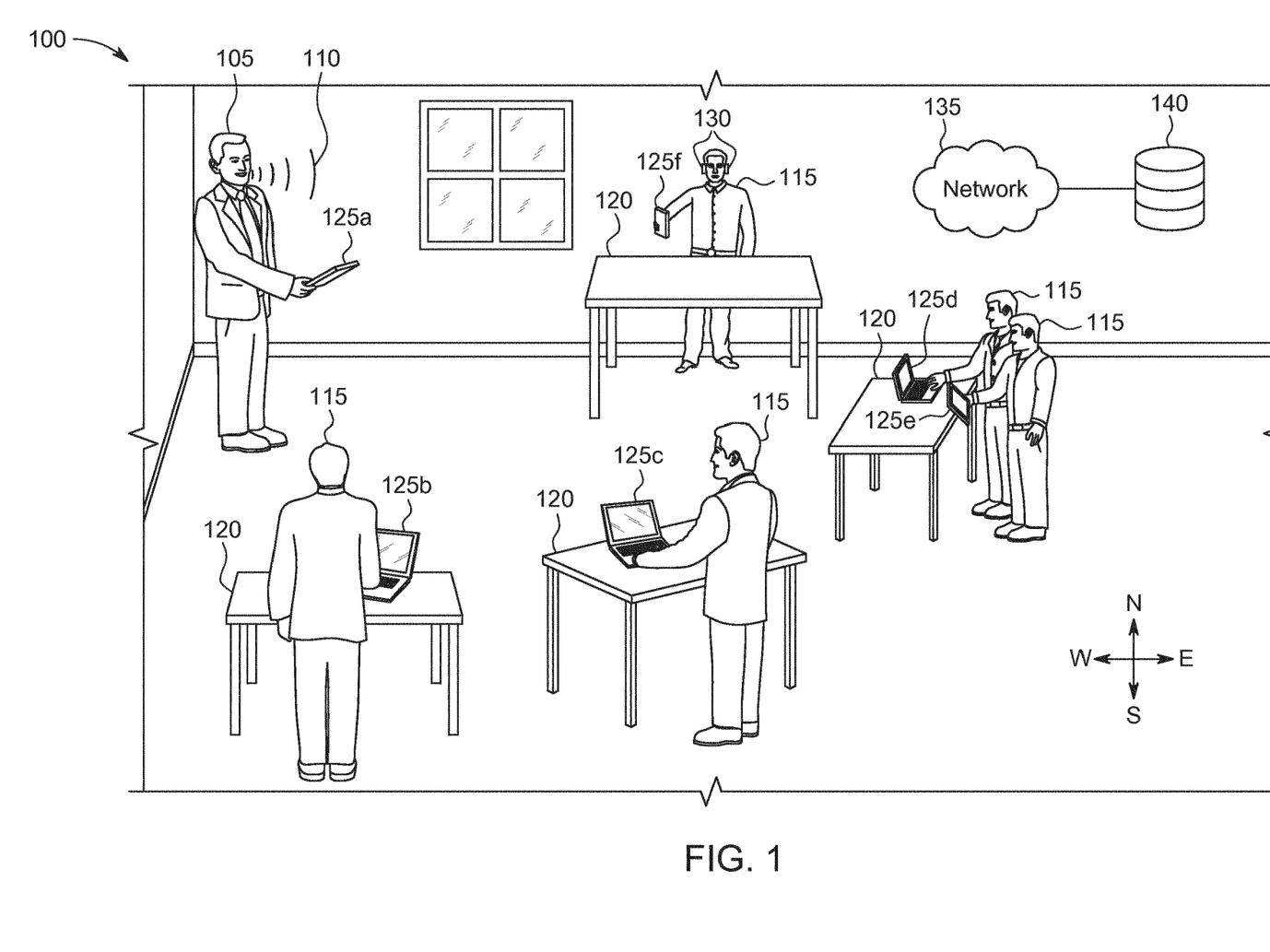
FIG. 1 illustrates a sound environment with a sound source and microphones in accordance with some implementations of the disclosed technology.

FIG. 1 illustrates a sound environment 100. FIG. 1 includes a sound source 105 transmitting a sound 110, listeners 115, tables 120, computing devices 125a-f configured to receive the transmitted sound 110, hearing device 130, network 135, and database 140 configured to communicate with the network 135. The sound environment 100 can be a classroom, lecture hall, living room, or office space with people listening to a lecture, music, or other audio information (e.g., a movie, presentation, speech). Although the sound source 105 is shown as a human in FIG. 1, the sound source 105 can be any type of sound source, including but not limited to, an electronic speaker (e.g., a smart speaker), a mobile phone, a handheld microphone that transmits audio signals, a musical instrument, television, transducer configured to produce an acoustical output, or combination thereof. As described in more detail in FIGS. 2 and 3, the disclosed technology operates the sound environment 100 to determine a microphone (e.g., embedded in one of the computing devices 125a-f) that is closest to the sound source 105. Each of the components of FIG. 1 are described in more detail in the proceeding paragraphs.

The computing devices 125a-f can be a mobile phone, smart phone, tablet computer, laptop computer, desktop computer, mobile media device, mobile gaming device, virtual or augmented reality headset, smart speaker, vehicle-based computer, wearable computing device (e.g., a wearable microphone, handheld microphone, smart watch), handheld microphone, body worn microphone, or portable electronic device. Each of the computing devices 125a-f can have at least one microphone physically and electronically coupled to the computing devices 125a-f. For example, the smartphone can have microphone for listening to users have a conversation and a microphone for recording sounds near the smartphone (e.g., when the smart phone is used as a voice recorder). In some implementations, the computing devices 125a-f can be a combination of a wireless microphone and a repeater unit that receives audio signals from the microphone and then transmits the audio signals. Each of the computing devices 125a-f can have a processor and a memory storing instructions that when executed by the processor cause the computing device 125a-f to send or receive information including audio signals or audio data. The computing devices 125a-f can also include smart speakers such as Amazon's Alexa™ or Echo™, Google's Google Home™, Apple's HomePod™, Sonos™ speakers, or other speakers systems with artificial intelligence algorithms for processing or providing sound.

The hearing device 130 provides audio to a user. Although the hearing device 130 can be a single device (e.g., headphones) or a multiple devices (e.g., a pair of hearing aids). In some implementations, the hearing device is a hearing aid, headphone, earphone, assisted listening device, or any combination thereof. The hearing device 130 can be a single device (e.g., one hearing aid) or multiple devices (e.g., two hearing aids). The hearing devices 130 can be both prescription devices and non-prescription devices configured to be worn on a human head. The hearing device 130 can include a housing (e.g., plastic or metal casing), sound tube (e.g., to enable the passage of sound), transducer (e.g., speaker), user input (also referred to as a "user control"), battery (e.g., Zinc-Air, rechargeable, or lithium ion battery), microphone(s), processor, and antenna configured to wirelessly communicate. The processor can include special-purpose hardware such as application specific integration circuits (ASICS), programmable logic devices (PLDs), field-programmable gate arrays (FPGAs), programmable circuitry (e.g., one or more microprocessors microcontrollers), Digital Signal Processor (DSP), appropriately programmed with software and/or firmware, or a combination of special purpose hardware and programmable circuitry. Using the processor, the hearing device 130 can execute algorithms (see FIG. 3) to provide sound to a user. In some implementations, the processor for a hearing device is physically and electronically coupled to memory such as volatile memory, nonvolatile memory and dynamic memory, where the memory stores algorithms (e.g., Fourier Transforms).

The hearing device 130 can communicate with the computing devices 125a-f using Bluetooth™ (e.g., Bluetooth Classic™, Bluetooth Low Energy™), Zigbee™, WiFi™, or any other 802.11 wireless communication protocol. If there is more than one hearing device 130, the hearing devices 130 can also communicate with each other using binaural communication or another wireless communication protocol. Some examples of hearing devices include behind-the-ear (BTE), receiver-the-canal (RIC), in-the-ear (ITE), or completely-in-the-canal (CIC) hearing aids. In some implementations, the computing devices 125a-f run an application or program to process or analyze data for the hearing device (e.g., fitting software, audio streaming, playback, TV audio, or other audio or data related information). In some implementations, the computing devices 125a-f include a processor such as application specific integration circuits (ASICS), programmable logic devices (PLDs), field-programmable gate arrays (FPGAs), programmable circuitry (e.g., one or more microprocessors microcontrollers), Digital Signal Processor (DSP), appropriately programmed with software and/or firmware, or a combination of special purpose hardware and programmable circuitry. Using the processor, the computing devices 125a-f can execute algorithms (see FIG. 3) to provide sound to a user or provide sound to a user via a hearing device that is in communication with the computing device(s) 125a-f.

The network 135 enables the hearing device 130 and the computing devices 125a-f to send and receive information from the Internet or between the devices. The network 135 can be a single network, multiple networks, or multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The network 135 can include communication networks such as a Global System for Mobile (GSM) mobile communications network, a code/time division multiple access (CDMA/TDMA) mobile communications network, a $3^{rd}$, $4^{th}$ or $5^{th}$ generation (3G/4G/5G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network such as a Wireless Local Area Network (WLAN). In some implementations, the network 135 is a Bluetooth™ network or a Wi-Fi™ network.

The network 135 can communicate with database 140, which stores, receives, and sends information to other devices. In some implementations, the database 140 can store all sounds generate in the sound environment 100. The database 140 can apply algorithms to analyze to data stored such as clustering algorithms, sorting algorithms, or matching algorithms to determine various properties of microphones. In some implementations, the database 140 stores information about a microphone coupled to one of the computing devices 125a-f that has previously been determined to be the microphone closest to a speaker. The database 140 can transmit this information to a user of the sound environment via an email or graphical user interface.

Figure 2:
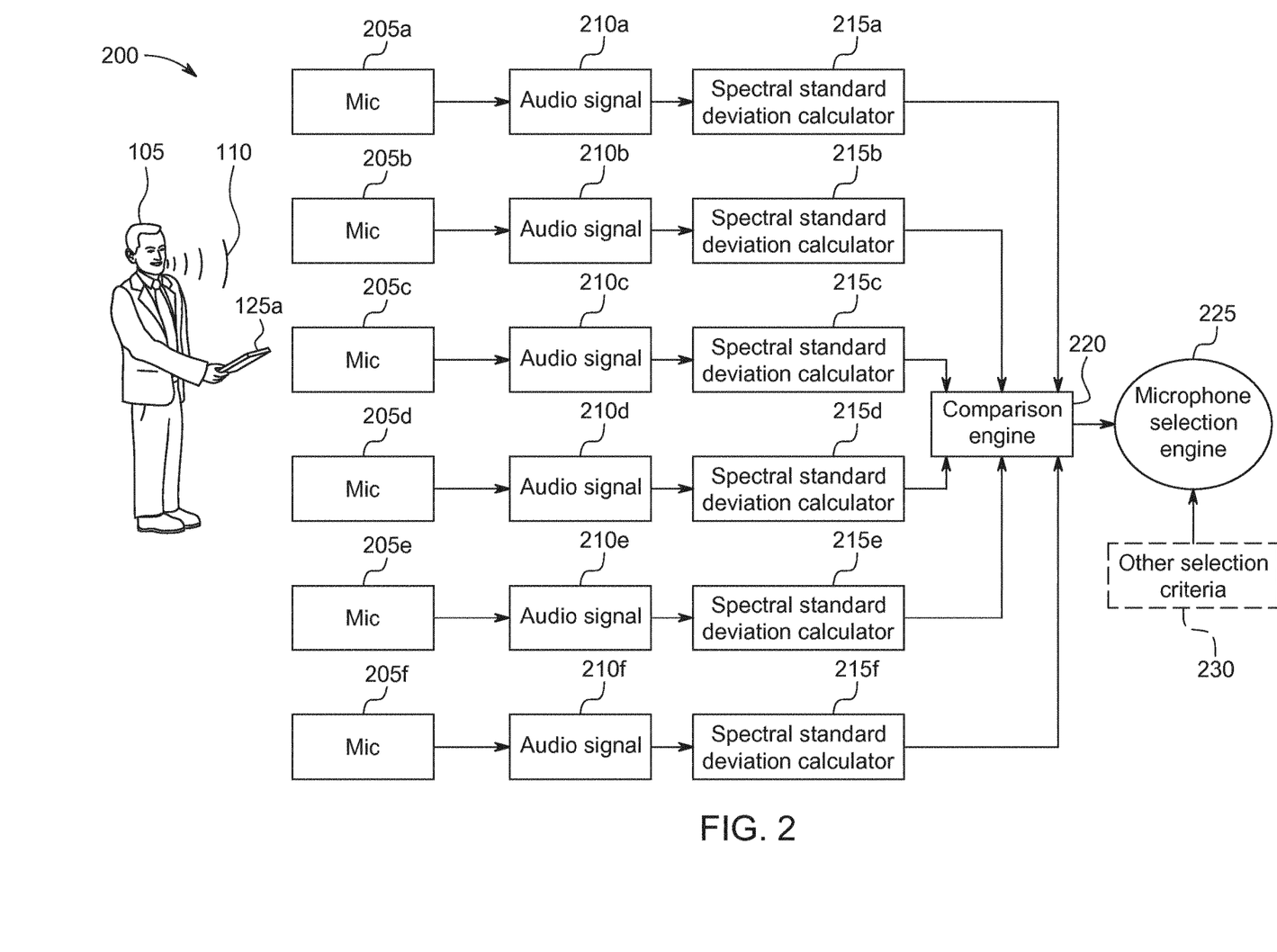
FIG. 2 illustrates a schematic block diagram for a system that performs operations for selecting a microphone in accordance with some implementations of the disclosed technology.

FIG. 2 illustrates a schematic block diagram for a system that performs operations for estimating the distance between a microphone and sound source. FIG. 2 includes the sound source 105, the sound 110, microphones 205a-f (also referred to as "audio signal sources" because microphones capture sound and produce or provide audio signals associated with the captured sound), audio signals 210a-f, spectral standard deviation calculators 215a-f, comparison engine 220, microphone selection engine 225, and other selection criteria engine 230. As a general overview, the microphones 205a-f capture audio signals 210a-f (e.g., Sa(ω), Sb(ω), Sc(ω), Sd(ω), Se(ω), and Sf(ω)), the spectral standard deviation calculators 215a-f compute the spectral standard deviations of the audio signals in dB (e.g., σA(ω), σb(ω), σc(ω), σd(ω), σe(ω), and σf(ω)), the obtained values of spectral standard deviation are then compared to detect which audio signal is closer to the sound source, and in some implementations other criteria can used to select a microphone.

The microphones 205a-f are associated with each of the computing devices 125a-f. For example, microphone 205a is the microphone for computing device 125a (e.g., a handheld microphone). In some implementations, a signal computing device 125a-f has multiple microphones, but each microphone can be treated as a separate microphone 205a-f. Each of the microphones 205a-f can have different properties such as a: different sensitivity, power supply, size, shape, location, directionality (e.g., unidirectional, beam forming, cardioid, or super cardioid). The audio input 210a-f are audio signals received by the microphones 205 a-f The audio signals can include audio data.

In some implementations, the spectral standard deviation calculators 215a-f are located on the microphones (e.g., a smartphone with a digital signal processor and a mobile application for processing the signal and computing a spectral standard deviation). In other implementations, the microphone 205a-f can send its audio signal via a wire or wirelessly to another device (e.g., a computer), and the other device can compute the spectral standard deviation of the audio signal locally using a processor (e.g., a digital signal processing unit). The spectral standard deviation calculator 215a-f can be a local digital signal processing unit (DSP) on the microphone or a DSP on another device, where the other device can communicate with microphone. In some implementations, the spectral standard deviation calculator calculates spectral standard deviations in frequency bands or full-band for the detection of the microphone sensor that is closer to a sound source. Here is an overall summary how the spectral standard deviation of the audio signal is closely related to the distance between a microphone and the sound source. Starting with Equation 1:

$$\sigma_{h,i} = f(d)$$

Where $\sigma_{h,i}$ is the spectral standard deviation of a room transfer function (RTF) of a frequency band, i, and d is source/microphone distance. The spectral standard deviation of the RTF depends on the distance of a sound source from a microphone. When a signal a(n) is reproduced at a specific position within a room and then captured at another position within the same room, the captured signal s(n) by a microphone is given by Equation 2:

$$s(n) = a(n) * h(n)$$

where h(n) is the room impulse response describing the acoustic path between the source and microphone. In the frequency domain, the equation above maybe described by Equation 3:

$$S(\omega) = A(\omega) \cdot H(\omega)$$

and in the dB it can be written as Equation 4:

$$S_{dB}(\omega) = A_{dB}(\omega) + H_{dB}(\omega)$$

Where $$S_{dB}(\omega) = 20 \cdot \log_{10} S(\omega)$$

$$A_{dB}(\omega) = 20 \cdot \log_{10} A(\omega)$$

$$H_{dB}(\omega) = 20 \cdot \log_{10} H(\omega)$$

Assuming that $H_{dB}(\omega)$ and $A_{dB}(\omega)$ are independent random variables, the standard deviation of these variables can be written as shown in Equation 5:

$$\sigma_s^2 = \sigma_a^2 + \sigma_h^2$$

where as, $\sigma_s$, $\sigma_a$, $\sigma_h$ are the full-band standard deviations of $S_{dB}(\omega)$, $H_{dB}(\omega)$ and $A_{dB}(\omega)$, respectively. Similarly, the same equation can be written for a specific frequency band i, as equation 6:

$$\sigma_{s,i}^2 = \sigma_{a,i}^2 + \sigma_{h,i}^2$$

The spectral standard deviation of RTFs, $\sigma_{h,i}$, is dependent on the source microphone distance. The spectral standard deviation of the anechoic signal, $\sigma_{\alpha,i}$, is distance-independent, the spectral standard deviation of the reverberant signal, $\sigma_{s,i}^2$, is the sum of the $\sigma_{h,i}^2$ and $\sigma_{\alpha,i}^2$.

Returning to FIG. 2, the comparison engine 220, the microphone selection engine 225, and the other selection criteria engine 230 implement algorithms to determine what microphone to select. In some implementations, these components are a combination of specialized hardware and software that analyzes the signal received from a microphone. The comparison engine 220 can compare spectral deviation values to determine a ranking, the lowest, highest, average, or median of values from different microphones.

The other selection criteria engine 230 includes algorithms for verifying or using another distance estimation method in addition to the spectral standard deviation method for estimating distance. In some implementations, the other selection criteria engine 230 can include using a source-localization and distance detection with a microphone array and to perform Time Delay Estimation (TDE). For example, other selection criteria engine can use a Generalized Cross-Correlation algorithm to calculate the position of a sound source based on an angle of arrival can be calculated from the TDE and applying the triangulation rule can lead to the position estimation. In other implementations, the other selection criteria engine 230 can use estimate the Direct-to-Reverberant Ratio (DRR), which can be extracted from measured Room Impulse Responses (RIRs). The comparison engine 220, the microphone selection engine 225, and the other selection criteria engine 230 can be physically or electronically coupled to a smartphone or other computing device (e.g., a hearing aid).

Figure 3:
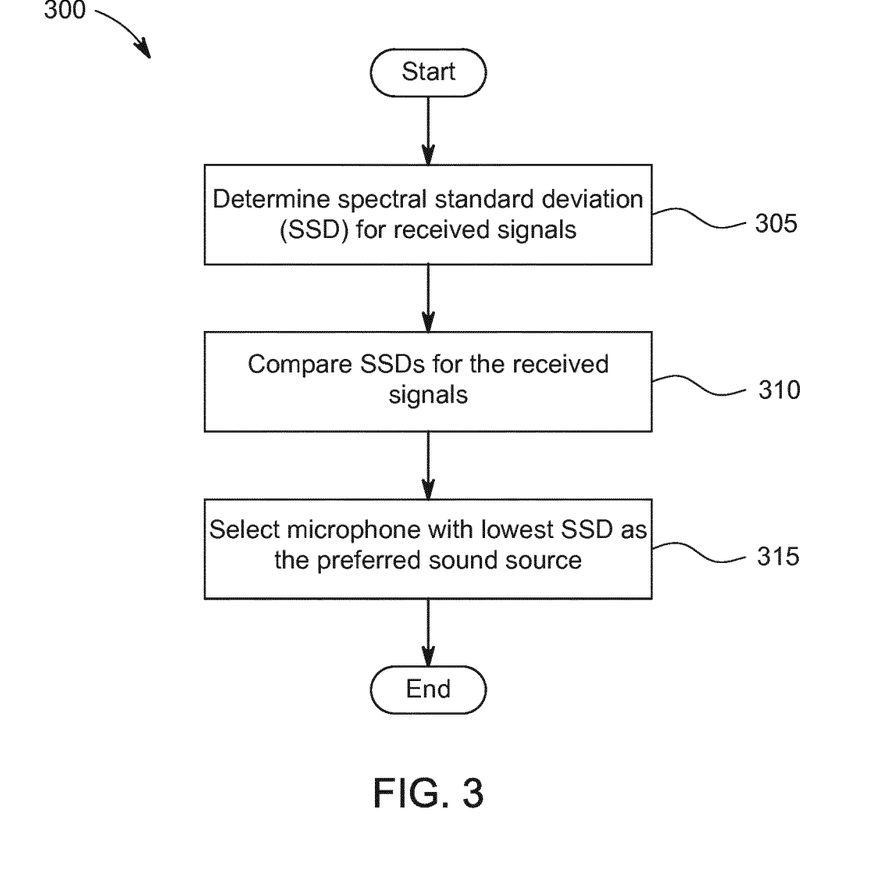
FIG. 3 illustrates a block flow diagram for selecting a microphone as a sound source in accordance with some implementations of the disclosed technology.

FIG. 3 illustrates a block flow diagram for a process 300 to select a microphone as to capture a sound source. A computing device (FIG. 1) can initiate the process 300 manually or automatically. For example, a computing device can start process 300 when it is running a program or application where it is receiving sound input from multiple devices with microphones and the computing device needs to select a microphone source. The process 300 can be executed on a single computing device (e.g., a laptop) or multiple devices (e.g., a network of computing devices using the process 300). For example, a smartphone can execute process 300 and receive and transmit information related to the process to a hearing aid.

At receiving operation 305, the computing device determines a spectral standard deviation for received signals. To determine the spectral standard deviations for received signals, a computer device can receive the spectral standard deviation values corresponding to each signal from a respective device or the computer device can determine the spectral standard deviation based on calculating the spectral standard deviation for a received signal.

To receive the spectral standard deviation values from respective devices, the computing device can receive spectral standard deviation information over a wired or wireless connection. For example, a wireless microphone can receive an audio signal, compute the spectral standard deviation for the received signal, and then send the computed spectral standard deviation value to the computing device. In some implementations, the computing device may not store or receive audio signals from a device until it has determined that microphone should be selected. For example, a computing device can receive spectral standard deviation values from multiple microphones, where each microphone computes a spectral standard deviation for a receive sound source and then sends only the spectral standard deviation value. In other words, microphones can send spectral standard deviation values without sending an audio signal or other data associated with the audio signal.

To determine the spectral standard deviation, the computing device can perform digital signal operations (e.g., Fourier Transforms) of the received signal to compute its spectral standard deviation. In some implementations, the computing devices uses the operations and equations shown in equations 1-6 (see FIG. 2) to calculate a spectral standard deviation. For example, the process 300 calculates the spectral standard deviation either in frequency bands or full-band for the detection of the microphone sensor that is closer to a sound source. For example, an instance of an audio signal is captured as a time domain waveform (s(n)), where n correspond to the time samples and consists of $\lambda$ number of samples, the audio signal is transformed to the frequency domain using the Fourier Transform and its spectrum is obtained (S($\omega$)), where $\omega$ is the frequency, then a magnitude of the spectrum is calculated in dB. ($S_{dB}(\omega)$) $S_{dB}(\omega)=20*\log_{10}(|S(\omega)|)$ and the standard deviation of the spectrum magnitude ($\sigma_s^2$) is calculated either for the full band signal and/or for a specific frequency band i ($\sigma_{s,i}^2$), which can include finding the mean of the magnitude spectrum ($\mu$) for all frequency bins, calculating the square of its distance to the mean, as $|s(n)-\mu|^2$ summing the values $\Sigma|s(n)-\mu|^2$ and dividing by the number of data points, as $(\Sigma|s(n)-\mu|^2)$ and determining the square root of the values obtained.

For example, a mobile device can receive 5 different signals from 5 different microphones in a room, where each microphone is associated (e.g., physically or electronically coupled to) a different electronic device. The mobile device can then determine a spectral standard deviation for each of these signals by computing the spectral standard deviation for each received signal.

TABLE 1

Example Table of Spectral Standard Deviations (SSDs)

| Microphone | Received SSD value or Computer SSD (dB) |
|---|---|
| 1 | 15 dB |
| 2 | 8 dB |
| 3 | 10 dB |
| 4 | 4 dB |
| 5 | 20 dB |

At determining operation 310, the computing device compares the spectral standard deviations for the received audio signals. For example, the computing device determines the received signal with the lowest and highest spectral standard deviation values, and then arranges the received signals in a list from lowest to highest. As shown in the table above for the received signals the computing device can generate the following table 2:

TABLE 2

| Microphone | Received SSD value or Computer SSD (dB) |
|---|---|
| 4 | 4 dB |
| 2 | 8 dB |
| 3 | 10 dB |
| 1 | 15 dB |
| 5 | 20 dB |

At selecting operation 315, the computing device selects a microphone based on the compared spectral standard deviation values. For example, the computing device can select Microphone 4 from the table 3 because it has the lowest spectral standard deviation value relative to the other microphones. After selecting the microphone, the computing device can being to receive or continue to use that microphone signal to provide audio information to a user. For example, the computing device can select a microphone associated with a mobile phone that a speaker has in his or her hand. The computing device can continue to stream audio from this mobile phone source and send the audio information to a user wearing a pair of hearing aids. After operation 315, the process 300 can end. In some implementations, the process 300 is repeated if it is determined the sound source moved or a new sound source is presented (where the new sound source is in a new location). For example, a user may indicate that a new speaker is providing sound or a global positioning signal (GPS) may indicate that a sound source is moving.

In some implementations, the process 300 can include other methods for estimating the distance of a sound source from a microphone in addition to using the spectral standard deviation values. For example, the process 300 can also estimate a sound source position relative to a microphone using positioning signals, time delay (e.g., comparing time delay), or other digital signal processing techniques.

In some implementations, the process 300 includes determining a signal-to-noise ratio for each of the multiple potential audio signal sources; determining that the signal-to-noise ratio for the selected potential sound source is below a threshold; and selecting a different potential sound source for providing sound to the user at least partially based on the spectral standard deviation value associated with the different potential sound source. A threshold can be set as a reasonable SNR ratio, where reasonable means a person can understand the signal such as an ISO 226 standard, which can be computed by taking the logarithm of a signal divided by the noise and picking a value that is above a threshold for recognizable human speech or music.

In some implementations, the process 300 can determine that two microphones have the same or similar spectral standard deviations values. The process 300 can select the signal with the better signal to noise ratio. Alternatively, the process 300 can provide a sample of each signal to a user and ask the user to select which one they prefer. After receiving a preference, the disclosed technology can stream audio from the user selected signal (also referred to as "locking" a signal based on user preference).

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, electromagnetic, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements. For example, the technology can apply to a conference room with multiple microphones or an open space with users each holding or carrying a smart phone.

The terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim.

The techniques, algorithms, and operations introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium includes non-transitory medium, where non-transitory excludes propagation signals. For example, a processor can be connected to a non-transitory computer-readable medium that stores instructions for executing instructions by the processor.

Further details regarding correlating standard spectral deviation and microphone distance to a source are shown below in Table 3. Table 3 was generated by placing multiple microphones in a different rooms and computing the spectral standard deviation. The first column includes the name of a room, the second column includes the volume of the room, the third column includes ($T_{60}$), the fourth column includes ($d_c$), the fifth column includes ($f_{schr}$), the sixth column includes a description of the room, the seventh column includes a type of microphone used to capture the sound, and the last column (eighth) includes spectral standard deviations values as a function of distance. As can be seen from Table 3, geometrical and acoustical characteristics of the rooms vary and the different types of microphones were used. The type of the microphone signals used (omni for the RIRs, KEMAR mics for the BRIRs and BTE satellite mics for the BTE RIRs). The last five columns show the obtained spectral standard deviation (SSD) values for various source distances (e.g., 1 m, 2 m, 3 m, 4 m, or 6 m) within these rooms.

TABLE 3

Standard Spectral Deviation Example with Rooms

| Room | Volume ($m^3$) | $T_{60}$ (s) | $d_c$ (m) | $f_{schr}$ (Hz) | Description | Microphone | SSD (dB) | | | | |
|---|---|---|---|---|---|---|---|---|---|---|---|
| | | | | | | | 1 m | 2 m | 3 m | 4 m | 6 m |
| A | 60 | 0.4 | 0.7 | 161 | Dressing room | OMNI | 14 | 15 | 16.2 | 17 | — |
| B | 336 | 0.7 | 1.2 | 91 | Classroom | OMNI | 14.5 | 15 | 16.1 | 16.2 | — |
| C | 1292 | 1 | 2 | 56 | Small Auditorium | OMNI | 14.1 | 14.8 | 15.6 | 17 | — |
| D | 9633 | 1.5 | 4.5 | 25 | Auditorium | OMNI | 13.4 | 13.9 | 14.4 | 15 | — |
| E | 12 | 0.12 | 0.6 | 200 | Sound Booth | KEMAR | 17.5 | 18 | 18.3 | 19.5 | — |
| F | 93 | 0.4 | 0.9 | 130 | Office | KEMAR | 15.5 | 16 | 16.8 | — | — |
| G | 370 | 0.8 | 1.2 | 93 | Lecture Room | KEMAR | 15.9 | 16.5 | 16.8 | 17 | — |
| H | 488 | 0.6 | 1.6 | 70 | Cafeteria | BTE | — | 20.5 | — | — | 22.3 |
| I | 262 | 0.6 | 1.2 | 0.6 | Classroom | BTE | — | 21.1 | — | — | 23.8 |
| J | 125 | 0.2 | 1.4 | 80 | Listening Room | BTE | — | 20.1 | — | — | 21.5 |
| K | — | 0.8 | — | — | Stairway Hall | KEMAR | 17 | 17.6 | 18 | — | — |
| L | — | high | — | — | Carolina Hall | KEMAR | 17.3 | 18 | 18.4 | 19.5 | — |

The sound for producing table 3 included an anechoic speech recording (male speech). The anechoic recording was convolved with i) room impulse responses using single-channel omnidirectional microphones (OMNI), ii) binaural room impulse responses measured with KEMAR microphones (KEMAR), iii) impulse responses measured with BTE satellite microphones (BTE). The responses were measured at different distances between source and receiver in various rooms. The volume, reverberation time (T60), the critical distance (dc) and the Schroeder frequency (fschr) can be seen in Table 3. The sampling frequency (fs) was 44.1 kHz. The table 3 demonstrated spectral standard deviation is closely correlated with distance between a sound source and microphone as can be seen in last columns of the table, where the spectral standard deviation values are indicated for various source/microphone distances.

Example Implementations

The following examples are implementations of the disclosed technology. In some implementations, the disclosed technology is a method for selecting a sound source, the method comprising: determining a spectral standard deviation value for multiple potential audio signal sources; determining the potential sound source with a lowest spectral standard deviation value at least partially based on a comparison of the spectral standard deviation values for the multiple potential source sources; and selecting the potential sound source with the lowest spectral standard deviation value as an input for providing sound to a user. The method can further comprise receiving the spectral standard deviation values from each potential sound source or determining the spectral standard deviation for each of the potential audio signal sources based on analyzing an audio signal from the potential sound source (e.g., each microphone locally determines the spectral standard deviation with a processor coupled to the microphone or the microphone transmits an captured audio signal to a computing device that determines the spectral standard deviation for the audio signal). The method can further comprise determining a signal-to-noise ratio for each of the multiple potential audio signal sources; determining that the signal-to-noise ratio for the selected potential sound source is below threshold; and selecting a different potential sound source for providing sound to the user at least partially based on the spectral standard deviation value associated with the different potential audio signal source.

For the method, the potential audio signal sources can be at least one of the following: a smart phone; a handheld microphone; a computer; a conference telephone; a tablet; a body-worn microphone; a smart speaker; a wearable electronic device; or a hearing device.

The method of claim 1 can include determining the spectral standard deviation further by: receiving a time domain waveform (s(n)) of an audio signal from one of the potential audio signal sources, wherein (n) corresponds to time samples and consists of λ number of samples; transforming the time domain waveform to frequency domain (S(ω)) using the Fourier Transform, where ω is frequency; determining a spectrum of the transformed waveform; computing a standard deviation of magnitude for the spectrum in either for a full band signal or for a specific frequency band; and determining a spectral standard deviation of the audio signal at least partially based on the standard deviation of magnitude for the spectrum.

The method of claim 1, wherein the operations further comprise: collecting and storing audio data from the multiple potential audio signal sources; executing a clustering algorithm on the stored audio data to determine a preferred location for a speaker or sound source or a preferred microphone position relative to a user. The method of claim 1, wherein determining the spectral standard deviation further comprises: computing the spectral standard deviation computed for with a frame sizes of 0.5 second, 1 second, 2 seconds, or 4 seconds.

In some implementations, the above method can be performed by a computing device or microphone, where the computing device of microphone executed the method by accessing a non-transitory computer-readable medium storing instructions for executing the method.

The invention claimed is:

1. A method for selecting a sound input, the method comprising:
determining a spectral standard deviation value for multiple potential audio signal sources;
determining the potential audio signal source with a lowest spectral standard deviation value at least partially based on a comparison of the spectral standard deviation values for the multiple potential audio signal sources; and selecting the potential audio signal source with the lowest spectral standard deviation value as an input for providing sound to a user.

2. The method of claim 1, wherein determining the spectral standard deviation values for multiple potential audio signal sources further comprises:

receiving the spectral standard deviation values from each potential audio signal sources; or determining the spectral standard deviation for each of the potential audio signal sources based on analyzing an audio signal from the audio signal source.

3. The method of claim 1, the method further comprising:

determining a signal-to-noise ratio for each of the multiple potential audio signal sources;

determining that the signal-to-noise ratio for the selected potential audio signal source is below a threshold; and selecting a different potential audio signal source for providing sound to the user at least partially based on the spectral standard deviation value associated with the different potential sound source.

4. The method of claim 1, wherein the potential audio signal sources are at least one of the following:
a smart phone;
a handheld microphone;
a computer;
a conference telephone;
a tablet;
a body-worn microphone;
a smart speaker;
a wearable electronic device; or
a hearing device.

5. The method of claim 1, wherein determining the spectral standard deviation further comprises:

receiving a time domain waveform (s(n)) of an audio signal from one of the potential audio signal sources, wherein (n) corresponds to time samples and consists of λ number of samples;

transforming the time domain waveform to frequency domain (S(ω)) using the Fourier Transform, where ω is frequency;

determining a spectrum of the transformed waveform;

computing a standard deviation of magnitude for the spectrum in either for a full band signal or for a specific frequency band; and determining a spectral standard deviation of the audio signal at least partially based on the standard deviation of magnitude for the spectrum.

6. The method of claim 1, wherein the operations further comprise:

collecting and storing audio data from the multiple potential audio signal sources;

executing a clustering algorithm on the stored audio data to determine a preferred location for a speaker or sound source or a preferred microphone position relative to a user.

7. The method of claim 1, wherein determining the spectral standard deviation further comprises:

computing the spectral standard deviation computed for with a frame sizes of 0.5 second, 1 second, 2 seconds, or 4 seconds.

8. A non-transitory computer-readable medium storing instructions that when executed by a processor cause device to perform operations for selecting a sound input, the operations comprising:

determining a spectral standard deviation value for multiple potential audio signal sources;

determining the potential audio signal source with a lowest spectral standard deviation value at least partially based on a comparison of the spectral standard deviation values for the multiple potential audio signal sources; and selecting the potential audio signal source with the lowest spectral standard deviation value as an input for providing sound to a user.

9. The non-transitory computer-readable medium of claim 8, receiving the spectral standard deviation values from each potential audio signal sources; or determining the spectral standard deviation for each of the potential audio signal sources based on analyzing an audio signal from the audio signal source.

10. The non-transitory computer-readable medium of claim 8, wherein the potential audio signal sources are at least one of the following:
a smart phone;
a handheld microphone;
a computer;
a conference telephone;
a tablet;
a body-worn microphone;
a smart speaker;
a wearable electronic device; or
a hearing device.

11. The non-transitory computer-readable medium of claim 8, wherein the operations further comprise:

determining a signal-to-noise ratio for each of the multiple potential audio signal sources;

determining that the signal-to-noise ratio for the selected potential audio signal source is below a threshold; and selecting a different potential audio signal source for providing sound to the user at least partially based on the spectral standard deviation value associated with the different potential audio signal source.

12. The non-transitory computer-readable medium of claim 8, wherein the operations are performed by a smart phone configured to wirelessly communicate with a hearing device.

13. The non-transitory computer-readable medium of claim 8, wherein the operations further comprise:

collecting and storing audio data from the multiple potential audio signal sources;

executing a clustering algorithm on the stored audio data to determine a preferred location for a speaker or sound source or a preferred microphone position relative to a user.

14. The non-transitory computer-readable medium of claim 8, wherein operations for determining the spectral standard deviation further comprise:

receiving a time domain waveform (s(n)) of an audio signal from one of the potential audio signal sources, wherein (n) corresponds to time samples and consists of λ number of samples;

transforming the time domain waveform to frequency domain (S(ω)) using the Fourier Transform, where ω is frequency;

determining a spectrum of the transformed waveform;

computing a standard deviation of magnitude for the spectrum in either for a full band signal or for a specific frequency band; and determining a spectral standard deviation of the audio signal at least partially based on the standard deviation of magnitude for the spectrum.

15. The non-transitory computer-readable medium of claim 8, the operations further comprising:
determining that two of the multiple potential audio signal sources have the same or similar spectral standard deviation values;
providing an option to select one of the two multiple potential audio signal sources; and
receiving a selection of the option, and providing the audio signal associated with the selected audio signal source.

* * * * *